United States Patent [19]

Johnston

[11] 4,027,543

[45] June 7, 1977

[54] METHOD FOR CURING ELASTOMERIC ARTICLES

[75] Inventor: Jonathan A. Johnston, Denver, Colo.

[73] Assignee: The Gates Rubber Company, Denver, Colo.

[22] Filed: Oct. 17, 1974

[21] Appl. No.: 515,759

[52] U.S. Cl. .............................. 74/231 R; 264/85; 264/94; 264/314; 264/322; 264/326; 264/347
[51] Int. Cl.² ...................... B29H 5/01; B29H 7/22
[58] Field of Search ............ 264/89, 314, 315, 347, 264/85, 319, 322, 326, 345, 94, DIG. 57, 231, 234, 236, 241; 74/231 R, 231 P, 232, 233, 234–237

[56] References Cited

UNITED STATES PATENTS

| | | | |
|---|---|---|---|
| 2,066,265 | 12/1936 | Freeman | 264/326 |
| 2,573,642 | 10/1951 | Hurry | 264/326 |
| 2,583,085 | 1/1952 | Campbell | 264/315 |
| 2,671,244 | 3/1954 | Freedlander | 264/315 |
| 2,703,436 | 3/1955 | Rhee et al. | 264/85 |
| 2,897,840 | 8/1959 | Roberts et al. | 264/DIG. 52 |
| 3,194,705 | 7/1965 | Caplan | 264/89 |
| 3,368,017 | 2/1968 | Lister | 264/347 |
| R22,188 | 9/1942 | Minor | 264/347 |

OTHER PUBLICATIONS

Perry et al., Chemical Engineer's Handbook, McGraw-Hill (N.Y.), 1963, pp.3–127.

Primary Examiner—Willard E. Hoag
Attorney, Agent, or Firm—Curtis H. Castleman, Jr.; Raymond Fink; H. W. Oberg, Jr.

[57] ABSTRACT

A method for curing vulcanizable elastomeric articles positioned between a mold surface and a pressure chamber including the steps of introducing into the chamber a hot fluid of relatively high heat capacity, e.g., steam, under pressure for a sufficient period to soften the article, introducing into the chamber a gas of relatively low heat capacity and pressurizing the gas in the chamber at a pressure substantially greater than the pressure under which the hot fluid was introduced, and thereafter vulcanizing the elastomeric article.

16 Claims, 9 Drawing Figures

METHOD FOR CURING ELASTOMERIC ARTICLES

BACKGROUND OF THE INVENTION

This invention relates to high pressure curing of elastomeric articles by expanding an elastic bladder member or the like against the article and thereby causing it to flow in a softened state against a contoured mold surface.

Various fluids have been used or proposed in the past for pressurizing an elastic bladder against the article to be vulcanized. The most prominent systems use either all steam or hot water curing mediums. The use of an inert gas either by itself or preceding the introduction of steam is also known, see, for instance, U.S. Pat. Nos. 661,178 to Hill, Jr., 676,350 to Bourn, 1,746,357 to Minor, and 1,871,120 to Denmire. In these applications the inert gas was used primarily in lieu of air or steam to prevent oxidation of the bladder member. The pressures disclosed in these prior art methods were generally considerably less than about 200 psi.

While these prior art curing methods have been more or less satisfactory for their specific purposes there exist certain problems which these methods do not address. One such problem, which is especially characteristic when using steam as a curing medium, is the failure to produce a balanced or uniform cure throughout the article being vulcanized; this is particularly evident when the article to be vulcanized has a non-uniform cross-sectional thickness at different locations along the article. In practice this problem is evidenced in the curing of tires which normally have a greater shoulder gauge than sidewall gauge, resulting quite often in over-curing the thinner portions of the cross-section and/or undercuring the thicker portions, with a significant reduction in tire road performance and mileage.

Another apparent problem which has been prevalent is that for many applications there has been insufficient adhesion between the elastomeric body of an article and its associated embedded reinforcement. This problem evidences itself in the field of high performance power transmission belting. This belting is often built up on a mandrel by applying layers of fabric and/or rubber over which is helically wound tensile cord in the form of a corded textile material or inorganic filament. A rubber containing layer is then applied over the reinforcement with or without a cover and the sleeve of belting is cured and individual endless belts are cut from the sleeve. Raw edge V-belts made in this manner may have severed edge cord ends exposed along the driving surfaces of the belt which have a tendency to delaminate and separate, leading to failure of the belt prematurely. The edge cord failure is believed to be at least partially caused by inadequate bonding to the rubber matrix.

The present invention has for its primary object the provision of a method for curing elastomeric articles which is both efficient and economical and which produces an article which is uniformly cured at higher than conventional pressures and is characterized by improved adhesion between the elastomeric body and any reinforcement which may be contained therein.

SUMMARY OF THE INVENTION

Briefly described, the present invention is drawn in one aspect to a method for curing vulcanizable elastomeric articles disposed between a mold surface and a pressure chamber comprising the steps of (1) introducing a hot fluid of relatively high heat capacity into the chamber under pressure; (2) maintaining the fluid in the chamber for a period sufficient to at least partially soften the elastomeric article; (3) introducing into the chamber a gas of low heat capacity relative to the hot fluid and elevating the pressure of this gas to a pressure substantially greater than the pressure of the hot fluid; and (4) vulcanizing the elastomeric article under the elevated pressure.

BRIEF DESCRIPTION OF THE DRAWINGS

Description of certain preferred embodiments of the invention will be made with reference to the accompanying drawings wherein like numerals designate like parts, and in which.

PREFERRED EMBODIMENTS OF THE INVENTION

Figure 1:
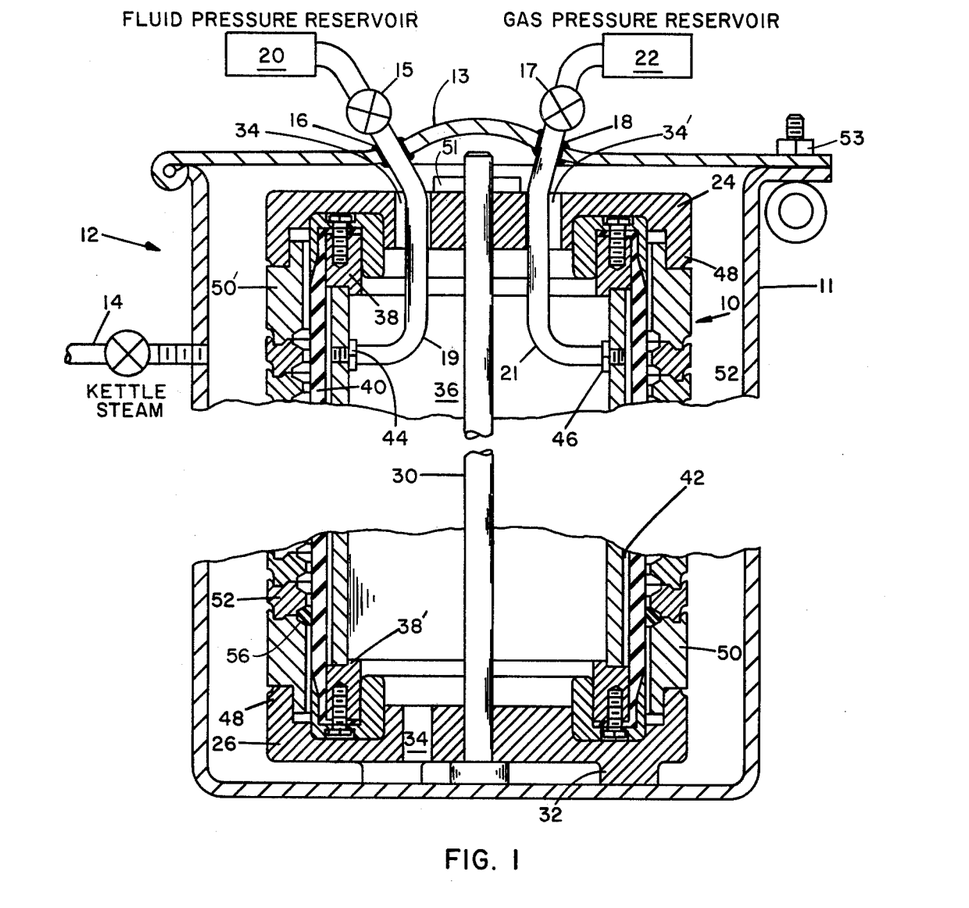
FIG. 1 is an elevational sectional view through an exemplary belt mold designed for use in carrying out the method of invention, taken along line 1—1, FIG. 2.
Figure 2:
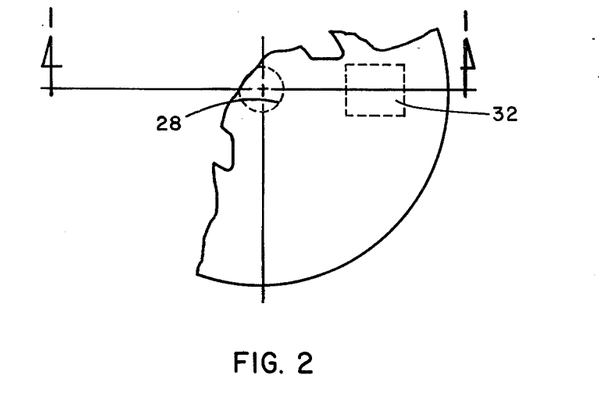
FIG. 2 is a bottom plan view of the mold partly broken away.
Figure 3:
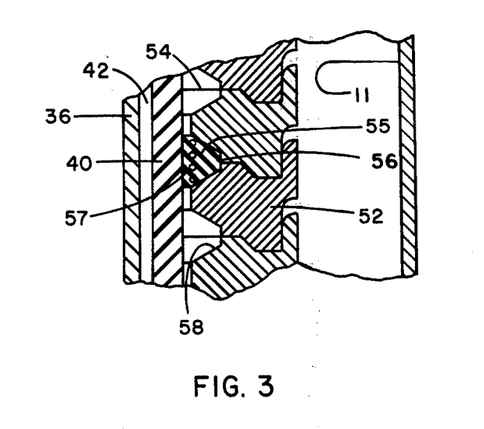
FIG. 3 is a fragmentary section of a portion of the mold shown in FIG. 1, enlarged.

The method according to the invention may be carried out using a multitude of different types of molds for molding various types of elastomeric articles, and the particular mold structure shown in FIGS. 1–3 is merely exemplary and forms no part of this invention. The particular ring-type mold of FIGS. 1–3 may be used to cure individual endless belts in piggy-back fashion. The individual belts may be obtained in conventional manner by building a sleeve of uncured belting containing a rubber matrix and sandwiched reinforcement on a lathe or building drum from which endless belts are severed. The flat belts are then skived to form the well known V or trapezoidal shape and then the uncured belting is ready to be placed in the mold. Alternatively, the conventional band of rubberized fabric may be wrapped about the belt prior to insertion in the mold cavity.

Referring now to FIG. 1, a mold generally designated at 10 is disposed within a vulcanizing kettle 12 equipped with inlet 14 in kettle wall 11 for delivery of kettle steam or other curing medium, and inlets 16, 18 in kettle top 13 for delivery of fluid and gas curing medium from reservoirs 20, 22 respectively, according to the invention.

The mold 10 generally includes circular end closure plates 24 and 26 provided with central opening 28 for the reception of a bolt 30 that secures them in assembled position. The bottom closure plate 26 carries downwardly extending seat 32 that serves to space the mold from the bottom of the vulcanizing kettle. The closure plates are also provided with a number of openings such as designated by reference numerals 34, 34'. Positioned between the end closure plates is an assembly comprising a metal cylinder 36 to the ends of which are secured annular spacers 38, 38'.

A heavy rubber cylinder 40 forms an elastic bladder element and surrounds the assembly comprising cylinder 36 and spacers 38, 38'. The ends of the bladder element, which are of reduced thickness are clamped into position with bolts, as shown.

With the outer diameter of spacers 38 and 3' being slightly greater than the outer diameter of cylinder 36, a space 42 is provided between the metal cylinder and bladder element thereby forming a pressure chamber. Metal cylinder 36 is provided with ports 44, 46 for the reception of conduits from fluid pressure reservoir 20 and gas pressure reservoir 22, respectively.

Between flanges 48 of the closure plates, there are positioned outer end rings 50, 50' and a plurality of nestable intermediate rings 52. The rings 52 are of the shape shown best in FIG. 3 which cooperate to form annular grooves 54 of the size and shape for reception of the belt 56 (having elastomeric body 55 and reinforcement 57) to be cured therein. The mold is loaded by repeatedly placing a belt against an inclined surface 58 of a ring, placing another ring over the belt which over-nests with the ring below it, placing another belt segment on the inclined surface of the uppermost ring, placing another ring upon it, etc. This operation is continued until all of the grooves are filled and then the closure plates of the mold are tightened down with the aid of nut 51, the kettle is closed and nut 53 secured, and then the belt segments are ready to be molded.

According to the method of the invention, valve 17 is closed, valve 15 is opened and fluid from pressure reservoir 20 is supplied to annular chamber 42 via conduit 19 and port 44. It is preferred that prior to this operation the chamber 42 will have been evacuated. The fluid supplied from reservoir 20 is hot when introduced and has a heat capacity (as measured by its specific heat) which is high on an absolute basis (i.e., preferably having a specific heat of at least about 0.9 cal/gm° C and more preferably at least about 20.0 cal/gm° C) as well as being considerably higher than the heat capacity of the gas which is later supplied from reservoir 22. Preferably, the heat capacity of the fluid is at least about 4 times and more preferably at least about 80 times the heat capacity of the gas, the significance which will be more fully discussed hereafter. Examples of suitable fluids include liquids such as hot oil and mixed glycols, although it is preferred to employ a condensable gaseous material, and most preferably a hot condensable gas such as steam. Equilibrium steam is most efficient thermally in this respect. When steam is employed, pressures preferably in the range of 130–200 psi may advantageously be employed although this range can be expanded depending upon the time period in which the steam is permitted to reside within chamber 42 prior to admitting gas from reservoir 22. The preferred temperature of the fluid which is introduced if comprising steam is at least about 300° F.

The steam or other fluid introduced through line 19 into the pressure chamber 42 is maintained within the chamber for a residence period sufficient to at least partially soften the elastomeric article 56. Simultaneously, the mold slab and particularly cylinder 36, bladder 40 and to come to some extent rings 52 are heated considerably. Pre-heating of the mold components is accomplished further by the kettle steam which is introduced through line 14 advantageously at the same time as fluid through conduit 19 is supplied, although the introduction of each may be at different times. The marginal outside portions of the mold such as the rings 52 are especially heated by the kettle steam. The kettle steam in general permeates throughout the vulcanizing chamber 12 including the interior of cylinder 36 by virtue of the passageway 34, 34'. In general, sufficient steam or other hot fluid is injected into chamber 42 which taken together with the kettle steam or other curing medium (e.g. hot water) supplies sufficient thermal energy for fully curing the elastomeric article.

After the elastomeric article has begun to at least partially soften (and well before curing) so as to permit some flowability for conformance with the mold surface, valve 17 is opened and gas is admitted to chamber 42 via line 21. The opening of valve 17 and closing of valve 15, respectively, may be coordinated to admit the gas from reservoir 22 approximately simultaneously with the deadending of fluid from reservoir 20, and a single two-way valve (not shown) could be used for this purpose. Alternatively, the gas from reservoir 22 may be admitted to the pressure chamber 42 prior to shutting off the fluid supply from reservoir 20 and an overlap of, for instance, approximately one minute has been found satisfactory in this regard, permitting a smooth transition between steps.

As aforementioned, the gas which is admitted has a heat capacity which is low relative to the heat capacity of the fluid from reservoir 20. As the gas enters the chamber 42 and admixes with the fluid which is present, thermal energy will thereby be transferred from the fluid to the gas. In the instance where steam is employed as the fluid, at least a portion of such steam will condense and drop out as water in the bottom of the chamber. The heat of condensation which is liberated during the process is important to the method of the present invention as it provides a needed additional thermal source of energy at precisely the location where it is most needed, viz., at the bladder element adjacent the inner side of the elastomeric article being cured (the outer side generally receives adequate heat transfer from the mold rings which are heated by the kettle steam). Sufficient thermal energy to cure the elastomeric article is provided even with relatively short fluid (steam) residence time.

The gases which may be supplied from reservoir 22 may be distinct gases or mixtures of gases, the most preferred material being those which are inert with respect to the bladder element 40, although this is not absolutely necessary. Suitable gases generally include nitrogen, air, flue gas, oxygen, and the like. High pressures are employed in this method and it is therefore important that the gas be permitted to acquire a pressure which is substantially independent of its temperature, and thus steam is not a suitable gas source for this purpose. Nitrogen, for instance, at a specified temperature can exist at widely varying pressures, unlike steam.

Significant advantages of the method of the invention are attributable to the high pressures employed. The gaseous material introduced from reservoir 22 is pressurized within chamber 42 well above the pressure at which the fluid from reservoir 20 existed within chamber 42. It is preferred that the gas pressure be elevated to at least 200 psi, more preferably in the range of 300 to about 520 psi, and most preferably pressures within the range of 375 to about 425 psi. In the case of the power transmission belt molded in the mold shown in FIGS. 1–3, the reinforcement band 57 which is shown as longitudinally extending spaced apart tensile cords, becomes securely bonded to the elastomeric matrix or body 55 by what is believed to be a combination of improved molecular cohesion, improved interfacial adhesive wetting, and mechanical adhesion resulting from the higher pressure employed than in previous processes of this type. In belts such as these failure due to edge cord fraying or delamination is significantly reduced from conventional low pressure cures as well as providing improved compliance and less hysteresis effect. In addition, any fabric reinforcement in the undercord portion of the belt becomes more highly penetrated by the rubber matrix which tends to achieve higher than normal densities as a result of the higher pressures employed.

With the elastomeric article soft and flowable together with the high pressures provided by the gas the elastomeric article is caused to flow into conformance with the mold surface and is maintained in that position for a sufficient time for the conventional vulcanizing or cross-linking reaction to take place. After the belts have been fully cured, the pressure against bladder 40 is relieved, the mold opened and disassembled ring by ring for recovery of the vulcanized V-belts.

While the manufacture of belting according to the invention has been shown in conjunction with a ring-type mold, clearly various types of molds and different constructions of belts may be cured without departing from the scope or spirit of the invention. Thus, referring to FIG. 4, a sleeve 61 of belting with reinforcement 62 is cured using a mandrel type cure. In this modification, the green belting sleeve is built up on drum or mandrel 64 and then placed within a mold shell 66 between which is disposed the bladder element 40. The same curing cycle is employed as was described with regard to the embodiment of FIG. 1, with fluid first being introduced in space 42 (such as by way of valve 45) and then high pressure gas supplied, which together with sufficient heat supplied to the interior of the mandrel (i.e., kettle steam) enables curing of the sleeve of belting. From this sleeve individual belts may be cut in conventional manner to provide raw edge or bandless type belts.

Alternative yet analogous to the mandrel type cure just discussed, the bladder can be placed on the inside of the mold and the sleeve of belting forced outwardly by the bladder into conformance with the mold shell. This is a shell type cure.

Figure 4:
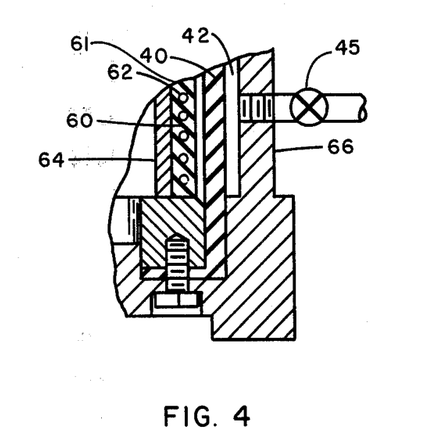
FIG. 4 is a section similar to that shown in FIG. 3 showing a modified mold element.

As another alternative, for instance, the inner mandrel 64 in FIG. 4 could be provided with axially extending grooves to enable manufacture of synchronous or positive drive belts having longitudinally spaced cogs or teeth of the type shown, for instance, in U.S. Pat. No. 3,772,929 to Redmond, Jr.

In a manner utilizing a similar method to that previously described for the production of belts, an elongated sleeve or tube of material can be molded in the form of a hose article, such as the corrugated hose shown in U.S. Pat. No. 3,274,316 to Songer. In this instance, the inflatable elastic bladder element can optionally be one in the same with the inner elastomeric tube used in manufacturing the hose and which therefor forms the inner tube portion of the finished hose article. The method of the invention improves bonding between the elastomeric body of the hose and reinforcement contained therein.

EXAMPLES

Advantages which the method of the present invention provide in the manufacture of pneumatic tires will be discussed with regard to test results in conjunction with FIGS. 5–9 of the drawings.

Figure 5:
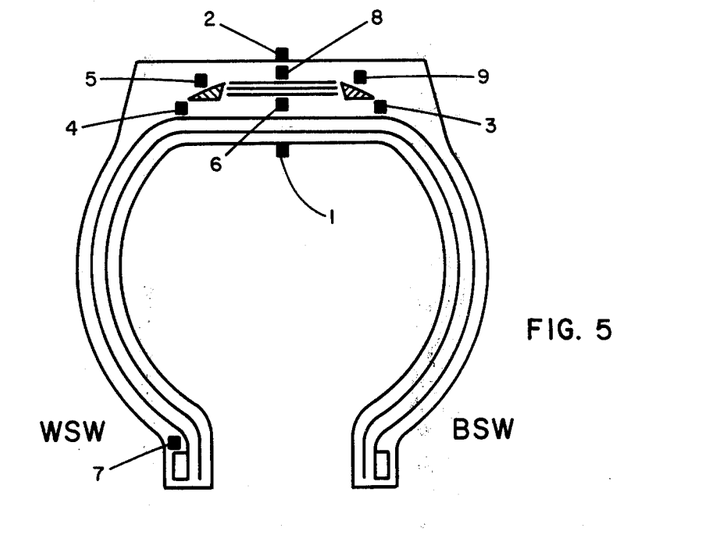
FIG. 5 is a diagrammatic sectional view of a passenger tire showing the location of nine specified thermocouple wires inserted therein at the locations specified in the legend.
Figure 6:
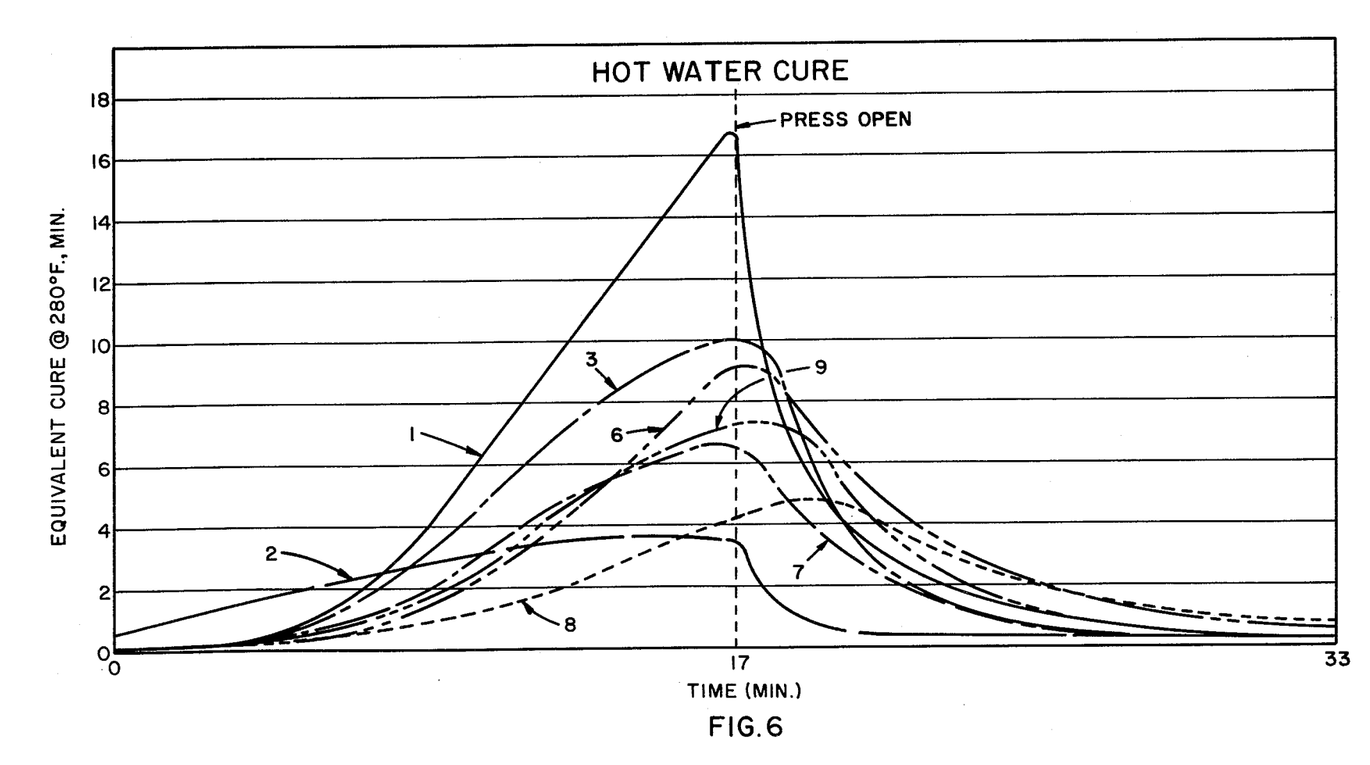
FIGS. 6–9 compare the uniformity in cures of the tire of FIG. 5 subjected to hot water cure, steam cure, and steam-high pressure nitrogen cure (FIGS. 8 and 9) according to the invention, respectively.
Figure 7:
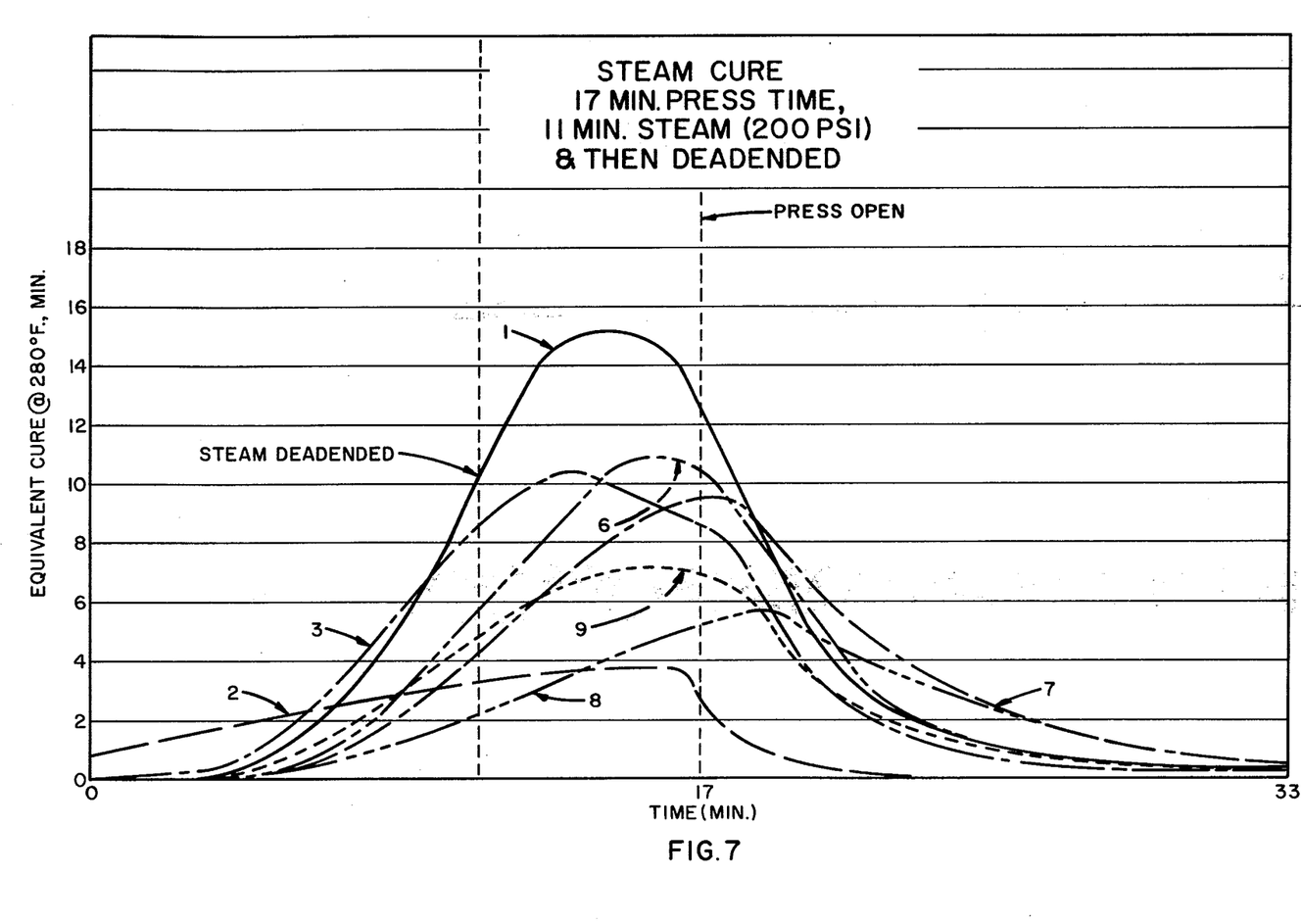
Figure 8:
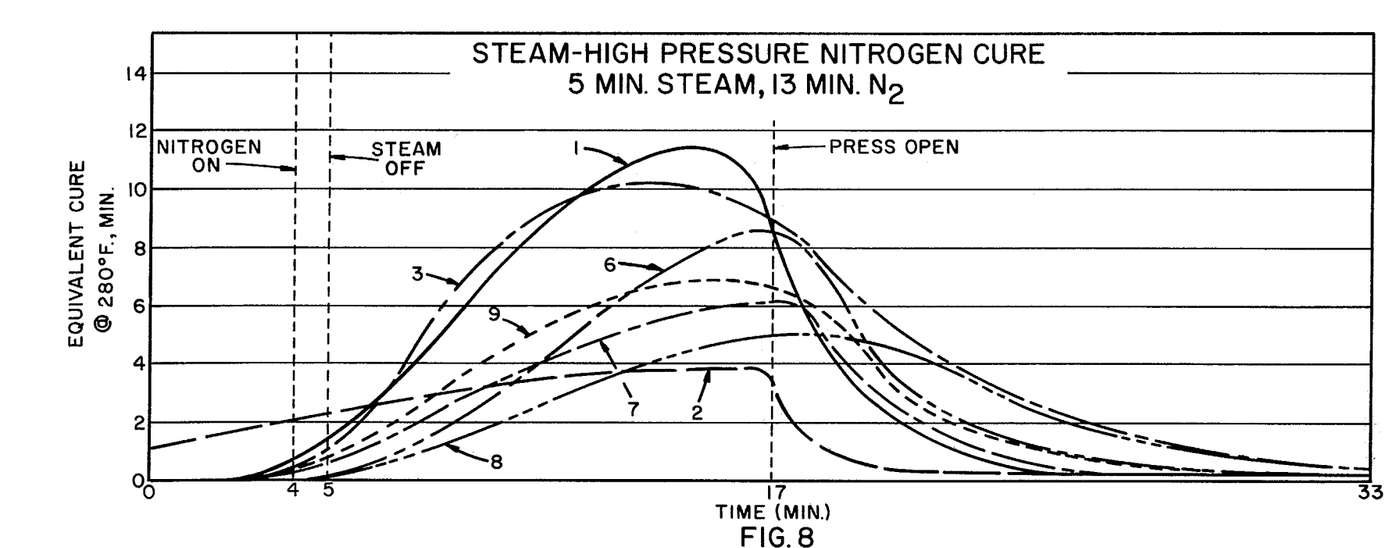

In FIG. 5 the black solid rectangles referenced with figure numbers 1–9 represent thermocouples placed in nine different locations in the tire body. Thermocouple FIG. 1 is positioned at the surface of the inner liner; figure number 2 represents a thermocouple placed at the surface of the tread; figure number 3 represents a thermocouple placed below the filler edge of the belt black sidewall; figure number 4 represents a thermocouple placed below the filler edge of the belt white sidewall; figure number 5 represents a thermocouple positioned above the filler edge of the belt white sidewall; figure number 6 represents a thermocouple positioned between the belt and the carcass; figure number 7 represents a thermocouple positioned in the bead; figure number 8 represents a thermocouple positioned above the belt; and FIG. 9 represents a thermocouple positioned above the filler edge of the belt black sidewall.

Four thermocouple tires, passenger size HR 78–15, were constructed with thermocouples placed in the nine different areas of the tire as shown in FIG. 5 and as referenced in the legend of that figure. One of the tires was then cured with a conventional production hot water cure, one utilized an all steam cure with 11 minutes of 200 psi steam applied, another with a steam-high pressure nitrogen cure according to the subject invention using 5 minutes of steam and 13 minutes of nitrogen and the last tire utilizing a steam-high pressure nitrogen cure of the subject invention with 3 minutes of steam and 15 minutes of nitrogen. Steam in all cases was at 200 psi and the nitrogen at 375 psi. The nitrogen was introduced 1 minute before the steam was cut off. FIGS. 6–9 indicate the equivalent cures (at 280° F, in minutes) in the various areas of the tire for each of the respective thermocouple tires. By "equivalent cure" (a concept known in the art) is meant the exponential relationship between cure time under a varying temperature regime and a reference temperature under isothermal conditions at an arbitrarily fixed time. In these examples the following relationship was used:

Equivalent cure, min. = $k (t_1 - T_o)/10$ where $k$ is the rate coefficient (1.5 used herein), $t_1$ is the variable temperature and $T_o$ is the reference temperature (280° F. herein).

Figure 9:
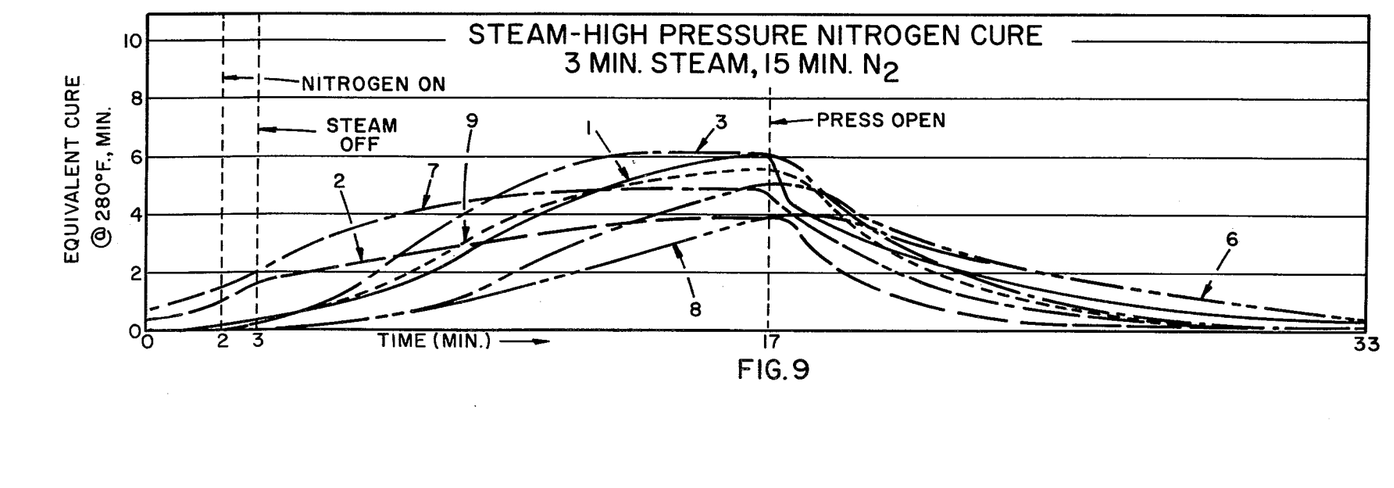

In general, it is seen in comparing FIGS. 6–9 that there is a definite strong balancing trend in cures throughout the tires from hot water to the three minute steam-nitrogen cycle as evidenced by a progressively smaller differential in equivalent cure minutes between the thermocouple which evidences the highest temperature at the time the press is opened as compared with the thermocouple which has the lowest temperature at press open time. As shown in the graphs, the surface of the innerliner, designated by the numeral 1, normally takes the least amount of time to cure whereas the interior tread area, designated by the numerals 3, 4 and 8 require the greatest amount of time to cure. The disparity is approximately 75 equivalent cure minutes in the case of hot water (FIG. 6), 83 equivalent cure minutes in the case of steam (FIG. 7), 56 equivalent cure minutes in the case of 5 minutes steam/13 minutes nitrogen (FIG. 8), and only approximately 21 equivalent cure minutes in the case of 3 minutes steam/15 minutes nitrogen (FIG. 9). The greatly reduced equivalent cure period for the innerliner surface according to the method of the subject invention (FIGS. 8 and 9) while maintaining the minimum required equivalent cure period for the interior tread area, substantially improves the balance of cure between exterior and interior regions of the tire, as evidenced by the reduction in disparities, shown above.

A similar test was conducted with a 7.00–15 LT truck tire and it was found that even better results (more balanced cures) were obtained using cycles of 2 minutes steam/31.5 minutes nitrogen and 1 minute steam/32.5 minutes nitrogen with a press open time of 35 minutes.

Tires cured by the method of the invention (steam/high pressure nitrogen) were also spin tested according to the high speed test portion of DOT 109 qualification standard and were found to withstand significantly higher speeds than control tires conventionally cured.

Fleet testing of the tires cured according to the invention revealed better durability than control tires subjected to the same fleet test conditions.

As additional illustrative examples, both the conventional all steam curing method and the high pressure curing method of the invention were applied to the manufacture of 36° raw edge endless V-belts having a 42 inch outside circumference and a top width of 0.380 inches. The belt was of conventional configuration for automotive applications having a rubber body with cord tensile members and several plies of fabric embedded in the overcord and undercord of the belt. All of the belts were cured in sleeve form using a shell-type mold apparatus with the air bag bladder positioned against the inner surface of the sleeve of belting. Steam was used as the curing medium in the kettle in all cases. The control belts were cured using steam (only) as the curing medium charged to the air bag (cure pressure about 140–170 psi). The remaining belts were cured according to the method of the invention in which steam was charged to the air bag and pressurized up to 200 psi for 1 to 1½ minutes and then back-filled with gaseous nitrogen for the remainder of the curing cycle at pressures of 300 psi, 400 psi and 500 psi, respectively. Three different belts cured at each of the three pressures along with the control belts were life tested at room temperature (85° ± 5° F) for comparison.

The test used was a three point, powered water break test (apparatus and procedure followed SAE J637a standard) employing a driver crank sheave, 4.75 inch outside diameter, rotating at 4900 rpm, a driven fan sheave, 4.75 inch outside diameter, rotating at 4900 rpm with an output of 12.0 H.P., and a driven generator tension sheave having an outside diameter of 2.00 inches and rotating at 11950 rpm. The torque developed by the fan sheave was 154.3 lb-inches. The belt tension ratio was 2.1:1. The results of the test in terms of belt life (average of the three belts tested for each of the cure pressures, and average of the control belts tested) are set forth in the table:

TABLE

|  | Control | 300 psi | 400 psi | 500 psi |
|---|---|---|---|---|
| Average life, hours | 26.5 | 34.4 | 59.4 | 40.7 |

The control belts evidenced almost immediate edge cord separation just after the test was begun. The high pressure cure belts exhibited no edge cord separation until near the end of the life of the belts, suggesting better captivation by the rubber matrix body.

It should be understood that the invention is capable of a variety of modifications and variations which will become apparent to one skilled in the art upon a reading of the present specification, and which are to be included within the scope of the claims appended hereto.

What is claimed is:

1. A method for curing reinforced vulcanizable elastomeric power transmission belting disposed between a mold surface and a pressure chamber, comprising the steps of:
    delivering into the chamber a hot fluid of relatively high heat capacity and pressurizing the fluid to a first pressure;
    maintaining the fluid in the chamber at the first pressure for a residence period sufficient to at least partially soften the elastomeric belting but insufficient to significantly vulcanize the elastomeric belting;
    while the elastomeric belting is in a softened state delivering into the chamber in admixture with the fluid a gas of low heat capacity relative to the hot fluid;
    pressurizing the gas and fluid in the chamber to a second pressure from about 300 to about 520 psi thereby causing the elastomeric belting to flow into conformance with the mold surface; and thereafter
    vulcanizing the elastomer belting by heating said mold surface.

2. The method of claim 1 wherein an expandable bladder is disposed between the elastomeric belting and the pressure chamber for urging the elastomeric belting against the mold surface.

3. The method of claim 1 wherein the hot fluid of relatively high heat capacity is a condensable gas at least a portion of which condenses when contacted by said gas of relatively low heat capacity to liberate heat of condensation which thereby transfers additional heat to the elastomeric belting being cured.

4. In a method for curing reinforced power transmission belting in a mold cavity defined by a substantially rigid mold surface adjacent one side of the belting and an elastic member adjacent the other side of the belting, said elastic member being expandable by an associated pressure chamber, the improvement comprising:
    introducing a condensable hot fluid medium into the chamber at a first pressure thereby expanding the elastic member against the rubber belting;
    maintaining the hot fluid medium at the first pressure in the chamber for a period of time and at a temperature sufficient to at least partially soften the rubber belting but insufficient to significantly vulcanize the rubber belting;
    while the rubber belting is softened introducing into the chamber in admixture with the hot fluid medium a gas of relatively low heat capacity and whose acquired pressure is substantially independent of its temperature;
    pressurizing the admixture of gas and hot fluid medium in the chamber to a second pressure from about 300 to about 520 psi which is substantially greater than said first pressure while simultaneously allowing the partial pressure of the hot fluid medium to progressively decrease below said first pressure; and thereafter vulcanizing the rubber belting by heating said mold surface.

5. In a method for curing a sleeve of vulcanizable reinforced rubber belting material is an annular mold cavity defined by a substantially rigid mold surface adjacent one side of the rubber material and a bladder adjacent the other side of the rubber material, said bladder being expandable toward the rubber material from an adjacent pressure chamber, the improvement comprising in sequential order the steps of:

introducing steam into the chamber at a first pressure and maintaining it in the chamber in the gaseous state for at least a period of time and at a temperature sufficient to soften the vulcanizable material but insufficient to significantly vulcanize the vulcanizable material;

introducing into the chamber a inert gas whose acquired pressure is independent of its temperature, thereby condensing at least a portion of said steam and elevating the temperature of the inert gas as a result of heat transfer from the condensing steam;

pressurizing the inert gas in the chamber, without further introducing significant amounts of steam, at a pressure greater than said first pressure and from about 300 to about 520 psi thereby expanding the bladder against the vulcanizable material and vulcanizing the rubber material by heating said mold surface.

6. Power transmission belting having a longitudinally extending tensile section disposed within a rubber matrix body portion, said tensile section being strongly adhered to said body portion, said belting made according to the process of claim 1.

7. In a method for curing a sleeve of belting of reinforced rubber material in a mold cavity defined by a substantially rigid mold surface adjacent one side of the rubber material and a bladder adjacent the other side of the rubber material pressurizable from an adjacent pressure chamber the improvement comprising:

introducing steam into the chamber at a first pressure and maintaining it in the chamber in the gaseous state for at least a period of time and at a temperature sufficient to at least partially soften the vulcanizable material but insufficient to significantly vulcanize the vulcanizable material;

introducing into the chamber in admixture with the steam a gas whose acquired pressure is independent of its temperature, thereby condensing at least a portion of said steam and elevating the temperature of the gas as a result of heat transfer from the condensing steam;

pressurizing the gas and steam in the chamber at a pressure within the range of from about 300 to about 520 psi and thereby expanding the bladder against the vulcanizable material, while simultaneously allowing the partial pressure of the steam to progressively decrease below said first pressure; and vulcanizing the rubber material by heating said mold surface.

8. The method of claim 7 wherein the gas is pressurized within the range of 375 to 425 psi.

9. The method of claim 1 wherein the heat capacity of the fluid is at least about 4 times the heat capacity of the gas.

10. The method of claim 9 wherein the fluid has a specific heat of at least about 0.9 cal/gm° C.

11. In a method for curing a sleeve of reinforced vulcanizable rubber belting material in a mold cavity defined by a substantially rigid mold surface adjacent one side of the rubber material and an inflatable bag adjacent the other side of the rubber material pressurizable from an adjacent pressure chamber, the improvement comprising:

introducing steam into the chamber at a first pressure and maintaining it in the chamber in the gaseous state at the first pressure for at least a period of time and at a temperature sufficient to soften the vulcanizable rubber material but insufficient to initiate significant vulcanization of the vulcanizable rubber material thereafter introducing into the chamber in admixture with the steam a gas which is substantially inert with respect to the inflatable bag member and which gas is at a lower temperature than the steam, thereby condensing at least a portion of said steam and elevating the temperature of the inert gas as a result of heat transfer from the condensing steam, the heat capacity of the steam being at least about 4 times the heat capacity of the gas;

while the rubber material is in a softened state pressurizing the inert gas and steam in the chamber without further introducing a significant amount of steam to a pressure within the range of 300 to about 520 psi which is substantially greater than said first pressure, and thereby expanding the bag member against the vulcanizable rubber material; and thereafter vulcanizing the rubber material, substantially without introducing additional steam into the chamber by heating said mold surface.

12. The method of claim 11 wherein the pressure range of 300 to 520 psi is maintained within the chamber by continually introducing inert gas and thereby raising its pressure, while continually condensing steam remaining in the chamber thereby continually reducing its pressure as it condenses.

13. A method of curing reinforced vulcanizable power transmission belting comprising:

forming in a cavity of mold containing the belting in at least a partially uncured state, the cavity having adjacent one side thereof an expandable member in operative association with a pressure chamber for urging the expandable member toward the belting;

introducing a fluid comprising steam into the chamber at a first pressure and a temperature of at least about 300° F. for at least a period of time sufficient to soften the vulcanizable belting but insufficient to significantly vulcanize the belting;

introducing into the chamber an inert gas;

while the belting is softened yet prior to vulcanization, elevating the pressure in the chamber containing the inert gas to between about 300 to about 520 psi while simultaneously reducing the partial pressure of the steam progressively below said first pressure; and vulcanizing the belting by applying heat to said mold 14. The method of claim 13 wherein the inert gas comprises nitrogen.

15. The method of claim 13 wherein the inert gas is flue gas.

16. The method of claim 13 wherein the pressure in the chamber containing the inert gas is elevated to within the range from about 375 to about 425 psi.

* * * * *